3,787,386
TRIPEPTIDE
George Rogelio Flouret, Waukegan, and John Wayne Cole, Deerfield, Ill., assignors to Abbott Laboratories, North Chicago, Ill.
No Drawing. Filed Mar. 24, 1972, Ser. No. 237,876
Int. Cl. C07c *103/52*
U.S. Cl. 260—112.5                    7 Claims

ABSTRACT OF THE DISCLOSURE

The tripeptide (O—R')Ser - (O—R")Tyr - Gly-OR wherein R is hydrogen, methyl or benzyl and R' and R" are protective groups on the hydroxy group of the tyrosyl and seryl moieties is a valuable intermediate for the manufacture of the gonadotropin-releasing hormone. It can easily be reacted to form the N$\alpha$-blocked fragment Trp-(O—R')Ser-(O—R")Tyr-Gly-OH which reacts with Leu-(N$^\omega$-R''')Arg-Pro-Gly-NH$_2$ carrying a protective group (R''') in the Arg moiety to the corresponding octapeptide from which Gn-RH can be obtained by removing the blocking group of Trp, reacting the deprotected octapeptide with N-protected histidine, removing the protective group of the latter, subsequently reacting the nonapeptide with N-protected pyroglutamic acid and removing all the protective groups, leaving only the unsubstituted decapeptide chain pyro - Glu-His-Trp-Ser-Tyr-Gly-Leu-Arg-Pro-Gly-NH$_2$.

DETAILED DESCRIPTION OF THE INVENTION

Recent discovery of the aminoacid sequence of the gonadotropin (Gn)-releasing hormone (RH) has made it highly desirable to produce this substance on a practical scale in a purity sufficient to use the substance therapeutically in instances of hormone deficiencies and possibly as a regulating agent for the ovulation cycle in female warm-blooded animals. For instance, small doses of this Gn-RH administered by intravenous injections to female sheep in the anestrus cycle produces ovulation. The formula of the Gn-RH has been identified with the aminoacid sequence pyro - Glu-His-Trp-Ser-Tyr-Gly-Leu-Arg-Pro-Gly-NH$_2$ but in order to make such a large molecule from simple, single aminoacids, a considerable number of steps including several condensation reactions are required. In order to assure such condensations to take place at the desired sites, other active sites or functional groups on the molecule usually must be protected by some groups that can be removed at will.

A relatively simple method has now been devised to produce the desired aminoacid chain from two tetrapeptide fragments. The new method involves a minimum of group-protecting and removal reactions for such protective groups and has the advantage of using a soluble intermediate tetrapeptide which can be coupled in a simple single-step process that does not cause racemization. This is a very important aspect of the present invention because Gn-RH consists of only L-amino acids and racemization must be avoided in each step of the synthesis for Gn-RH to prevent the latter from being diluted with inactive material. For the purpose of the present invention, all aminoacids referred to are in their optically active L-form except for glycine.

It is the main object of the present invention to provide protected Ser-Tyr-Gly-OR wherein R represents H, CH$_3$ or benzyl. Another object of this invention is to provide a diprotected, N$^\alpha$-blocked tripeptide fragment that can be used for the synthesis of longer peptide chains. Other objects will become apparent from the following disclosure and the appended claims.

The objects of this invention are accomplished by providing compounds of the formula

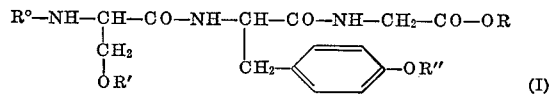

wherein R is hydrogen, methyl or benzyl, R' and R" both are easily removable protective groups and R° is hydrogen or a blocking group that can be chemically removed without the simultaneous removal of R' and R" and without damage to the aminoacid links.

In a general embodiment, R' and R" are protective groups that are bound more firmly to the tyrosyl and seryl moieties than R° so that the latter may be removed without simultaneously removing R' or R". In this manner, R' and R" can be retained to protect the hydroxy function on serine and tyrosine during subsequent reactions with other aminoacids which gives the new compounds of Formula I unique advantages over other known Ser-Tyr-Gly compounds. In another embodiment, R° is hydrogen which makes the compounds of Forula I immediately suitable for coupling it with other aminoacids in which the amino group in turn is protected by an easily removable protective group of the type of R°.

The various protective groups R°, R, R' and R" are preferably selected as follows: R° when different from hydrogen, may be a halo-, nitro-or phenyl-substituted benzyloxycarbonyl, tert.-butoxycarbonyl, o - nitrophenylsulfenyl or 2 - (diphenyl)isopropyloxycarbonyl. R is methyl or benzyl but the unprotected acid (R=H) is also included in the scope of this invention. Among the varieties for R' and R" moieties, tetrahydropyranyl, tert.-butyl, acetyl, benzyloxycarbonyl, benzyl or triphenylmethyl give the desired stability. All these substituents are bound strongly enough to the respective oxygen functions to withstand the conversion of R° to hydrogen.

In a more specific embodiment of the present invention, (O—R")Tyr-Gly-OH or its benzyl or methyl ester is coupled with serine p-nitrophenyl ester carrying one of the above named protective and blocking groups R' and R° at a temperature between 0 and 30° C. in the presence of an inert reaction medium. The resulting dipeptide is then selectively deblocked, followed by treatment with a basic resin. In this manner, the compound of Structure I is obtained wherein R is hydrogen, methyl or benzyl, R° is hydrogen and R' and R" are the protective groups initially carried on the tyrosine and serine derivatives used in the coupling reaction. For best results, the reaction medium used in this coupling step contains an inert acid absorber such as triethylamine.

The new compound of Formula I wherein R° is hydrogen and R, R' and R" are the groups described above can be used in a variety of peptide syntheses. As an example, the above compounds, preferably wherein R is methyl or benzyl, can be coupled with BOC-Trp and the ensuing tetrapeptide is hydrolyzed (when R is methyl or benzyl) to yield the free tetrapeptide acid. This latter step, of course, is not required where the initial starting material is (O—R")Tyr-Gly-OH. One of the tetrapeptides obtained in this manner is BOC-Trp-(O—R')Ser-(O—R")Tyr-Gly-OH which can be coupled to Leu-(N$^\omega$-R''')Arg-Pro-Gly-NH$_2$ to form a triprotected, blocked octapeptide useful for the preparation of the decapeptide recognized as Gn-RH.

The second tetrapeptide mentioned above can be made by a similar reaction sequence as the tetrapeptide described in more detail. The protective group R''' for arginine can be tosyl, acetyl, benzyloxycarbonyl or the nitro group.

The two tetrapeptides, after coupling the $N^\alpha$-deprotecting, form the triprotected octapeptide Trp-(O—R')Ser-(O—R'')Tyr-Gly-Leu-(N—R''')Arg-Pro - Gly-$NH_2$ which is, in turn, coupled with $N^\alpha$-protected histidine which may carry an additional protective group in the $N^{Im}$-position. The new $N^\alpha$-protection is then removed and the obtained tri- (or tetra-) protected nonapeptide is coupled with pyroglutamic acid pentachlorophenyl ester. The decapeptide is then wetted with anisole and placed in a HF-resistant reaction vessel and treated there at a temperature beween 0° and 30° C. with excess hydrogen fluoride. The excess hydrogen fluoride and the anisole is removed after about one hour, and the product is dried and purified. The Gn-RH prepared in this manner is highly active in biological tests showing luteinizing hormone-releasing activity in warm-blooded animals. If desired, the protective groups may be removed stepwise, e.g., where some of the protective groups in the octa- or decapeptide are benzyl (Bzl), these groups may be removed by hydrogenation and subsequently, any other protective group may be removed with hydrogen fluoride.

In order to illustrate the preparation of the new protected L-dipeptide, reference is made to the following examples, which, however, are not intended to limit the invention in any respect.

Example 1

(a) To a stirred mixture of 1.26 g. of glycine methyl ester hydrochloride, 20 ml. of methylene dichloride and 1.0 g. of triethylamine at 10° C. was added a solution of 3.8 g. of tert.-butyloxycarbonyl-O-benzyl-tyrosine p-nitrophenyl ester in 20 ml. of methylene chloride. Stirring was continued for one hour at 10° C. and then for 39 hours at room temperature. Evaporation of the solvent left a residue which was dissolved in ethyl acetate and then washed in a separatory funnel in turn with water, 10% aqueous citric acid, water, 2% aqueous sodium bicarbonate and water. The ethyl acetate solution was concentrated in vacuo to a residue, which was crystallized from anhydrous ether giving a first crop of 2.30 g. of white crystals, M.P. 119–120° C. and a second crop of 0.41 g. of white crystals, M.P. 118–119° C. The filtrate was then treated with 2 g of a basic resin (Rexyn 201 marketed by Fischer Scientific Co.) in 20 ml. of methanol/ether 1:1 to remove the p-nitrophenyl byproduct to give a new filtrate which, upon concentration, deposited a third crop of white needles weighing 0.37 g., M.P. 120° C. The total yield of crystalline BOC-(O-Bzl)Tyr-Gly-$OCH_3$ amounted to 3.07 g. or 90% of the theoretical amount based on the tyrosine ester used.

The three crops were found to be homogeneous by TLC analysis. A vacuum dried sample, M.P. 120° C., was analyzed and confirmed the formula $C_{24}H_{30}N_2O_6$ assigned to this compound. The optical rotation was $[\alpha]_D^{24}=-7°$ (c. 1, DMF).

(b) A sample of the above product, upon hydrolysis with an aqueous methanol solution of one equivalent of sodium hydroxide at room temperature for 3 hours and subsequent acidification, gave a sample of BOC-(O-Bzl)Tyr-Gly-OH $C_{23}H_{28}N_2O_6$ which crystallized from ethyl acetate plus anhydrous ether as white crystals, M.P. 151–152° C. This also gives a correct C, H and N analysis.

(c) In a modification of the above, glycine benzyl ester was used in place of the above glycine methyl ester hydrochloride, yielding the corresponding benzyl ester BOC-(O-Bzl)-Tyr-Gly-OBzl of the formula $C_{30}H_{34}N_2O_6$ which was obtained as a waxy amorphous solid. This product upon ester exchange with anhydrous methanol and a basic resin produced the methyl ester, M.P. 119–120° C., described above.

(d) A mixture of 2.08 g. of the compound of Example 1(a) and 18 ml. of 4 molar hydrogen chloride in anhydrous dioxan at room temperature was stirred for 40 minutes. After evaporating the mixture, the residue was taken up in 5 ml. of anhydrous ether and the mixture was evaporated in vacuo. The residue was dissolved in 25 ml. of anhydrous methanol and treated with 12 g. (about 3 times the theoretical amount) of a basic resin (Fischer Scientific, Rexyn 201) to remove the hydrochloric acid. The filtrate was concentrated to yield 1.8 g. of crude amorphous, solid (O-Bzl)Tyr-Gly-$OCH_3$.

(e) A mixture of 1.8 g. of the amorphous (O-Bzl)-tyrosyl glycine methyl ester of Example 1(d), 1.18 g. of BOC-(O-Bzl)Ser-OH and 15 ml. of methylene chloride was stirred and cooled to 5° C. To this mixture was added 0.87 g. of dicyclohexylcarbodiimide, which was rinsed into the reaction mixture with 3 ml. of methylene chloride. The mixture was stirred in the cold for 30 minutes and for 16 hours at room temperature. The resulting mixture was filtered to remove crystalline dicyclohexylurea by-product and the filtrate plus methylene chloride washings were transferred to a separatory funnel and washed as described in Example 1(a). The resulting methylene chloride solution was decanted and evaporated in vacuo to a residue which dried in vacuo to a white solid froth. This material was crystallized from methanol/anhydrous ether 1:1 to give a first crop of 1.40 g., M.P. 127–128° C. and a second crop of 0.89 g., M.P. 121–125° C.

These crops were equivalent in TLC analysis. A sample, melting at 127–128° C. after drying in vacuo, gave the correct C, H and N analysis for BOC(O-Bzl)Ser-(O-Bzl)Tyr-Gly-$OCH_3$ of formula $C_{34}H_{41}N_3O_8$.

(f) The corresponding benzyl ester, BOC-(O-Bzl)Ser-(O-Bzl)Tyr-Gly-OBzl was prepared in the same way as shown above, using BOC-(O-Bzl)Ser-OH and (O-Bzl)Tyr-Gly-OBzl as starting materials. It melts at about 78° C. (variable with rate of heating), shows $[\alpha]_D^{25}-15°$ (DMF) and analyzes correctly for $C_{40}H_{45}N_3O_8$.

The free acid made from the above esters was obtained as an amorphous product.

Example 2

In a round-bottom flask, a mixture of 1.24 g. of BOC-(O-Bzl)Ser-(O-Bzl)Tyr-Gly-$OCH_3$ and 15 ml. of 4 molar hydrogen chloride in anhydrous dioxan was swirled to a clear solution and kept at room temperature for 40 minutes at which time it was evaporated in vacuo. The residue was dissolved in methanol and the solution was again evaporated in vacuo to yield a white crystalline layer of the hydrochloride of (O-Bzl)Ser-(O-Bzl)Tyr-Gly-$OCH_3$. This was identified only by TLC analysis. The whole product was dissolved in methanol and treated with 6 g. of a basic resin (Rexyn 201) and the filtrate was evaporated to yield 1.043 g. of the amorphous basic ester (O-Bzl)Ser-(O-Bzl)Tyr-Gly-$OCH_3$ analyzing correctly for $C_{29}H_{33}N_3O_6$. The material gave the expected low-$R_f$ TLC pattern and a positive ninhydrin color test.

When the BOC-(O-Bzl)Tyr p-nitrophenyl ester used in Example 1(a) is replaced by BOC-(O-THP)Tyr, BOC-(O-t-Bu)Tyr, BOC-(O-Ac)Tyr, BOC-(O-BOC)Tyr or BOC-(O-TPM)Tyr p-nitrophenyl esters, essentially the same compounds are obtained except that the ensuing tripeptide of Formula I carries in place of R'' (t-Bu), acetyl (Ac), tert. - butyloxycarbonyl (BOC), triphenylmethyl (TPM), tetrahydropyranyl (THP) or hydrogen. In most instances, the protective groups are retained while removing the BOC group from the $N^\alpha$-nitrogen and they may be retained during further build up of the peptide chain, while still being removable at will when their protective capacity is no longer required. In all instances, the R'' moieties lend themselves to easy removal through a chemical reaction that is sufficiently mild that it does not affect the links between the individual aminoacids.

Similarly, the BOC-(O-Bzl)Ser ester used above may be replaced by other serine esters, carrying different protective or blocking groups. Particularly suitable O-protective groups are those listed above as R" which, of course, will have the same stability during the deblocking of the $N^\alpha$-substituent. Also, it will be obvious to those skilled in the art, that the above described BOC-blocking group may be replaced by other well-known blocking groups that may be removed without affecting the protective groups attached to the hydroxy functions of the tripeptide or the aminoacid links in the peptide chain, e.g., where R° of the structure of Formula I is o-nitrophenylsulfenyl, 2-(diphenyl)isopropyloxycarbonyl or the like.

We claim:
1. The compound of the formula

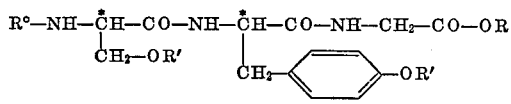

wherein R is hydrogen, methyl or benzyl, R° is a protective group that can easily be removed by a chemical treatment which does not affect the peptide chain and does not remove protective groups R' and R", and wherein R' and R" are the same or different protective groups that can be removed by a simple chemical treatment that does not affect the aminoacid chain and * denotes the L-configuration.

2. The compound of claim 1 wherein R is benzyl, R° is tert.-butyloxycarbonyl and R' and R" are benzyl.
3. The compound of claim 1 wherein R is methyl, R° is tert.-butyloxycarbonyl and R' and R" are benzyl.
4. The compound of claim 1 wherein R is methyl, R° is hydrogen and R' and R" are benzyl.
5. The compound of claim 1 wherein R is hydrogen, R° is tert.-butoxycarbonyl and R' and R" both are benzyl.
6. The compound of claim 1 wherein R and R° both are hydrogen and R' and R" both are benzyl.
7. The compound of claim 1 wherein R° is hydrogen and R, R' and R" all are benzyl.

References Cited
UNITED STATES PATENTS
3,374,218   3/1968   Bernardi et al. _____ 260—112.5

ELBERT L. ROBERTS, Primary Examiner

U.S. Cl. X.R.
424—177